(12) United States Patent
Kwon et al.

(10) Patent No.: US 9,267,055 B2
(45) Date of Patent: Feb. 23, 2016

(54) COATING COMPOSITION WITH EXCELLENT TACTILE CHARACTERISTICS, PREPARATION METHOD THEREOF, AND TRANSFER SHEET USING SAME

(71) Applicant: LG Hausys, Ltd., Seoul (KR)

(72) Inventors: Dong Joo Kwon, Daejeon (KR); Won-Kook Kim, Daejeon (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 14/396,588

(22) PCT Filed: Dec. 11, 2012

(86) PCT No.: PCT/KR2012/010751
§ 371 (c)(1),
(2) Date: Oct. 23, 2014

(87) PCT Pub. No.: WO2013/168871
PCT Pub. Date: Nov. 14, 2013

(65) Prior Publication Data
US 2015/0118454 A1    Apr. 30, 2015

(30) Foreign Application Priority Data
May 8, 2012 (KR) .................. 10-2012-0048644

(51) Int. Cl.
| | | |
|---|---|---|
| C09D 133/14 | (2006.01) | |
| C08G 18/63 | (2006.01) | |
| C08F 299/00 | (2006.01) | |
| C08G 18/00 | (2006.01) | |
| C08G 18/61 | (2006.01) | |
| C09D 133/04 | (2006.01) | |
| C09D 4/06 | (2006.01) | |
| C09D 133/06 | (2006.01) | |
| C09D 143/04 | (2006.01) | |
| C08F 290/06 | (2006.01) | |
| C08F 299/08 | (2006.01) | |
| C09D 155/00 | (2006.01) | |
| B41M 7/00 | (2006.01) | |
| C08F 220/32 | (2006.01) | |
| C08F 230/08 | (2006.01) | |

(52) U.S. Cl.
CPC .......... *C09D 133/14* (2013.01); *C08F 290/068* (2013.01); *C08F 299/00* (2013.01); *C08F 299/08* (2013.01); *C08G 18/00* (2013.01); *C08G 18/61* (2013.01); *C08G 18/63* (2013.01); *C08G 18/633* (2013.01); *C09D 4/06* (2013.01); *C09D 133/04* (2013.01); *C09D 133/06* (2013.01); *C09D 133/068* (2013.01); *C09D 143/04* (2013.01); *C09D 155/005* (2013.01); *B41M 7/0045* (2013.01); *C08F 220/32* (2013.01); *C08F 230/08* (2013.01); *Y10T 428/24851* (2015.01); *Y10T 428/2839* (2015.01)

(58) Field of Classification Search
CPC ...... C08G 18/633; C08G 18/00; C08G 18/63; C08G 18/61; C08F 299/08; C08F 299/00
See application file for complete search history.

(56) References Cited

U.S. PATENT DOCUMENTS

| | | | | |
|---|---|---|---|---|
| 5,378,735 A | * | 1/1995 | Hosokawa et al. | 522/79 |
| 5,438,080 A | * | 8/1995 | Ohama et al. | 522/97 |
| 2006/0148924 A1 | * | 7/2006 | Lachowicz et al. | 522/114 |
| 2008/0241554 A1 | | 10/2008 | Tanaka | |
| 2009/0155513 A1 | | 6/2009 | Yoneyama et al. | |
| 2010/0248452 A1 | | 9/2010 | Saito et al. | |

FOREIGN PATENT DOCUMENTS

| | | |
|---|---|---|
| CN | 87103823 A | 1/1988 |
| JP | 2006052356 A | 2/2006 |
| JP | 2006328364 A | 12/2006 |
| JP | 2008239724 A | 10/2008 |
| JP | 2009024168 A | 2/2009 |
| KR | 20100026012 A | 3/2010 |
| TW | 200704663 A | 2/2007 |

OTHER PUBLICATIONS

International Search Report for PCT/KR2012/010751 mailed on Feb. 28, 2013.
European extended search report dated Apr. 8, 2015 from EPO in connection with the counterpart European Patent Application No. 12876199.6.
Chinese Office Action corresponding to Chinese Application No. 201280072957.6 dated Nov. 24, 2015.

* cited by examiner

*Primary Examiner* — Betelhem Shewareged
(74) *Attorney, Agent, or Firm* — Hauptman Ham, LLP

(57) ABSTRACT

The present invention provides: a coating composition comprising a UV curable resin containing an acryloyl functional group, an isocyanate-based compound, an antioxidant, and a solvent, wherein the UV curable resin is prepared by copolymerization of an acrylate monomer containing an epoxy functional group and a silicone macromonomer and then performing addition reaction of an acrylic acid monomer; and a preparation method thereof. The present invention provides a transfer sheet comprising: a base film; and a coating layer formed on one surface of the base film, wherein the coating layer comprises a coating composition comprising a UV curable resin containing an acryloyl functional group, an isocyanate-based compound, an antioxidant, and a solvent, and the UV curable resin containing an acryloyl functional group is prepared by copolymerization of an acrylate monomer containing an epoxy functional group and a silicone macromonomer and then performing addition reaction of an acrylic acid monomer.

10 Claims, 2 Drawing Sheets

COATING COMPOSITION WITH EXCELLENT TACTILE CHARACTERISTICS, PREPARATION METHOD THEREOF, AND TRANSFER SHEET USING SAME

CROSS REFERENCE TO RELATED APPLICATION

This application claims the priority of Korean Patent Application No. 10-2012-0048644 filed on May 8, 2012 in the Korean Patent and Trademark Office. Further, this application is the National Phase application of International Application No. PCT/KR2012/010751 filed on Dec. 11, 2012, which is incorporated herein by reference in its entirety.

TECHNICAL FIELD

The present invention relates to a decorative transfer sheet of molded articles. More particularly, the present invention relates to a coating composition, which exhibits excellent tactility upon EB curing and UV curing, a method for preparing the same, and a transfer sheet using the same.

BACKGROUND ART

In fabrication of existing transfer sheets through EB curing or UV curing, the use of a urethane coating liquid containing a silicone additive or a silicone polyol to impart soft tactility provides problems, such as poor attachment due to interface transfer of the additive, deterioration in abrasion resistance, and the like. In addition, there are problems of blocking upon winding of a transfer sheet, and solvent erosion upon printing.

Korean Patent Laid-open Publication No. 10-2010-0026012 discloses a hard coating film which allows easy molding and also exhibits excellent film strength such as scratch resistance, abrasion resistance, and the like. However, since the publication does not disclose a coating composition exhibiting excellent tactility, and the like, it is still difficult to solve the above problems.

DISCLOSURE

Technical Problem

It is an aspect of the present invention to provide a coating composition which can realize abrasion resistance and soft tactility while solving problems of blocking, interface transfer of an additive, and poor attachment.

It is another aspect of the present invention to provide a method for preparing the above coating composition.

It is a further aspect of the present invention to provide a transfer sheet using the above coating composition.

Technical Solution

In accordance with one aspect of the present invention, a coating composition includes an acryloyl functional group-containing UV curable resin, an isocyanate compound, a photoinitiator, an antioxidant, and a solvent, wherein the acryloyl functional group-containing UV curable resin is prepared by copolymerization of an epoxy functional group-containing acrylate monomer and a silicone macromonomer, followed by addition reaction of an acrylic acid monomer.

In accordance with another aspect of the present invention, a method for preparing a coating composition includes: preparing an acryloyl functional group-containing UV curable resin; and mixing the UV curable resin with an isocyanate compound, a photoinitiator, an antioxidant and a solvent.

In accordance with a further aspect of the present invention, a transfer sheet includes: a base film; and a coating layer which is formed on one surface of the base film and includes an acryloyl functional group-containing UV curable resin, an isocyanate compound, a photoinitiator, an antioxidant, and a solvent, wherein the acryloyl functional group-containing UV curable resin is prepared by copolymerization of an epoxy functional group-containing acrylate monomer and a silicone macromonomer, followed by addition reaction of an acrylic acid monomer.

Advantageous Effects

According to the present invention, the coating composition exhibits excellent abrasion resistance while realizing soft tactility by introduction of the silicone macromonomer into the UV curable resin, and can overcome a blocking phenomenon by minimization of stickiness.

In addition, according to the present invention, since the transfer film uses the coating composition according to the present invention, the transfer film exhibits improved solvent resistance and thus can exhibit print properties and prevent solvent erosion even without use of excess curing agent.

BEST MODE

Figure 1:
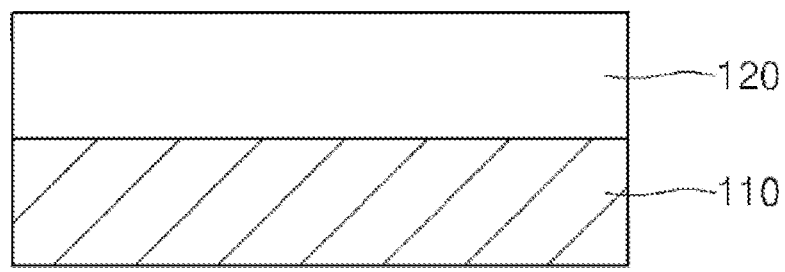
FIG. 1 schematically shows a transfer sheet according to one embodiment of the present invention.

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof.

Hereinafter, embodiments of the present invention will be described in detail with reference to the accompanying drawings.

According to the present invention, a coating composition includes an acryloyl functional group-containing UV curable resin, an isocyanate compound, a photoinitiator, an antioxidant, and a solvent.

UV Curable Resin

According to the present invention, the acryloyl functional group-containing UV curable resin is prepared by copolymerization of an epoxy functional group-containing acrylate monomer and a silicone macromonomer, followed by addition reaction of an acrylic acid monomer.

More particularly, the epoxy functional group-containing acrylate monomer and the silicone macromonomer may be copolymerized, thereby preparing an acryl-silicone macromonomer copolymer. Here, to adjust a glass transition temperature (Tg) of the acryl-silicone macromonomer copolymer, a (meth)acrylic acid ester monomer or a vinyl monomer may be added.

Examples of the (meth)acrylic acid ester monomer may include: (meth)acrylic acid ester; such as (meth)acrylic acid alkyl esters (where the alkyl group is a $C_1$ to $C_8$, preferably $C_1$ to $C_6$ alkyl group), such as (meth)acrylic acid methyl ester, (meth)acrylic acid ethyl ester, (meth)acrylic acid iso-propyl ester, (meth)acrylic acid n-butyl ester, (meth)acrylic acid iso-butyl ester, (meth)acrylic acid t-butyl ester, (meth)acrylic acid 2-ethylhexyl ester, (meth)acrylic acid lauryl ester, (meth)acrylic acid stearyl ester, and the like; acrylic acid aryl esters (where the aryl group is a $C_6$ to $C_{20}$ aryl group), such as (meth)acrylic acid phenyl ester, and the like; (meth)acrylic acid cycloalkyl esters (where the cycloalkyl group is a $C_3$ to $C_{12}$ cycloalkyl group), such as (meth)acrylic acid cyclohexyl ester, and the like; (meth)acrylic acid polyalkylene glycol esters, such as polyethylene glycol mono(meth)acrylate, and the like; and (meth)acrylic acid alkoxyalkyl esters (where the alkoxyalkyl group is a $C_1$ to $C_6$ alkoxyalkyl group). Here, methyl methacrylate is most advantageous in increasing the glass transition temperature of the acryl-silicone macromonomer copolymer.

Examples of the vinyl monomer may include styrene, vinyl acetate, vinyl propionate, vinyl benzoate, vinyl toluene, and the like.

The epoxy functional group-containing acrylate monomer is any one selected from the group consisting of glycidyl acrylate, glycidyl methacrylate, glycidyl-α-ethyl acrylate, glycidyl-α-n-propyl acrylate, glycidyl-α-butyl acrylate, 3,4-epoxybutyl methacrylate, 3,4-epoxybutyl acrylate, 6,7-epoxyheptyl methacrylate, 6,7-epoxyheptyl acrylate, and 6,7-epoxyheptyl-α-ethyl acrylate. Among commercialized epoxy functional group-containing acrylate monomers, glycidyl methacrylate is lowest-priced and most advantageous as a monomer having similar reactivity to methyl methacrylate, which is added to adjust the glass transition temperature of the acryl-silicone macromonomer copolymer, upon radical reaction therewith.

In addition, the silicone macromonomer according to the present invention is represented by Formula 1:

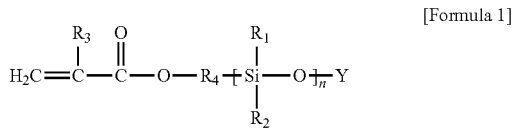

[Formula 1]

wherein $R_1$ and $R_2$ are each independently a $C_1$ to $C_{12}$ alkyl group; $R_3$ and $R_4$ are each independently hydrogen or a $C_1$ to $C_{12}$ alkyl group; Y is hydrogen or a $C_1$ to $C_{12}$ alkyl group; and n is an integer from 60 to 300.

The silicone macromonomer has a weight average molecular weight from 500 to 22,000. Within this range, the coating composition can exhibit excellent abrasion resistance and thus realize soft tactility. More particularly, if the weight average molecular weight of the silicone macromonomer is less than 500, the coating composition exhibits insignificant soft tactility, if the weight average molecular weight of the silicone macromonomer is greater than 22,000, it is difficult to prepare a uniform polymer since the silicone macromonomer causes a problem of compatibility with a monomer involved in copolymerization, and there is also a problem of significant deterioration in transparency of the coating composition.

Here, "macromonomer" is for macromolecular monomer. In addition, the macromonomer is a polymer and an oligomer, which have a polymerizable functional group only at an end of a molecule, and is a precursor of a block or graft polymer. By copolymerization of the macromonomer with another polymer, it is easy to synthesize block and graft polymers having a clear structure. In particular, among the macromonomers, since the silicone macromonomer includes a silicon ring having low surface energy, the synthesized block and graft polymers are segregated and concentrated on a surface of a resin when blended with the resin.

Since the silicone macromonomer is introduced into the epoxy functional group-containing acrylate monomer, the coating composition can realize soft tactility and maintain excellent abrasion resistance. In addition, since stickiness of the coating composition is minimized, blocking can be prevented even when a film having a certain length or more in a transfer sheet state is wound, and since the coating composition exhibits improved solvent resistance, the coating composition can exhibit print properties and be prevented from solvent erosion.

The acrylic acid monomer may include acrylic acid, methacrylic acid, carboxyethyl acrylate, carboxyethyl methacrylate, carboxypropyl acrylate, carboxypropyl methacrylate, carboxybutyl methacrylate, and the like. According to the present invention, the acrylic acid monomer may be an acrylic acid monomer or a methacrylic acid monomer, which allows the copolymer to have the highest possible glass transition temperature after completion of addition. In particular, the acrylic acid monomer is preferably an acrylic acid monomer that is most easily cured upon UV irradiation.

Here, addition reaction of the acrylic acid monomer to the acryl-silicone macromonomer copolymer is performed, thereby preparing a UV curable resin including an acryloyl functional group having a molecular weight from 10,000 to 140,000.

The silicone macromonomer may be present in an amount of 0.1 parts by weight to 5 parts by weight based on 100 parts by weight of the epoxy functional group-containing acrylate monomer. If the amount of the silicone macromonomer is less than 0.1 parts by weight based on 100 parts by weight of the acrylate monomer, it is difficult for the coating composition to exhibit desired soft tactility, and if the amount of the silicone macromonomer is greater than 5 parts by weight, there is a problem in that coating of an additional layer is impossible.

In one embodiment, using 0.1 parts by weight to 5 parts by weight of the silicone macromonomer, 100 parts by weight to 500 parts by weight of propylene glycol monomethyl ether acetate as a solvent, 0.5 parts by weight to 5 parts by weight of AIBN as a catalyst, and 0.1 parts by weight to 5 parts by weight of dodecyl mercaptan as a chain transfer agent based on 100 parts by weight of the epoxy functional group-containing acrylate monomer, reaction is performed at a temperature of 65° C. for 12 hours, thereby obtaining the acryl-silicone macromonomer copolymer.

Next, 15 parts by weight to 100 parts by weight of the acrylic acid monomer, 10 parts by weight to 100 parts by weight of propylene glycol monomethyl ether acetate as a dilution solvent, and 0.2 parts by weight to 1 part by weight of triethylamine as a catalyst are added to the acryl-silicone macromonomer copolymer based on 100 parts by weight of the epoxy functional group-containing acrylate monomer, followed by reaction at a temperature of 120° C. for 10 hours, thereby preparing the UV curable resin including the acryloyl functional group having a molecular weight from 10,000 to 140,000.

Other Components

Other additives may be further added to the UV curable resin. The additives include the isocyanate compound, the photoinitiator, the antioxidant, the solvent, and the like.

To form a coating film using the coating composition, the coating composition is mixed with the isocyanate compound, which is a thermal curing agent, immediately before use. The isocyanate compound reacts with a secondary hydroxyl functional group, which is naturally generated by addition reaction of carboxyl and epoxy functional groups of acrylic acid upon preparation of the acryloyl functional group-containing UV curable resin, thereby forming a crosslink in the urethane bond.

Examples of the isocyanate compound may include aliphatic isocyanate compounds such as hexamethylene diisocyanate (HMDI) and isophorone diisocyanate (IPDI), and/or aromatic isocyanate compounds such as toluene diisocyanate (TDI). Preferably, the isocyanate compound is a non-yellowing curing agent such as hexamethylene diisocyanate (HMDI) in terms of weather resistance.

The amount of the isocyanate compound is adjusted such that an equivalent of an isocyanate group in the compound is mixed in an appropriate ratio with the secondary hydroxyl functional group, which is naturally generated by addition reaction of the carboxyl and epoxy functional groups of acrylic acid. The isocyanate compound may be present in an amount of 1 part by weight to 15 parts by weight, particularly 5 parts by weight to 12 parts by weight based on 100 parts by weight of the acryloyl functional group-containing UV curable resin.

If the amount of the isocyanate compound is less than 1 part by weight, the coating film suffers from a blocking phenomenon upon winding and can suffer from turbidity, bend bursting or the like upon injection molding due to deterioration in film strength. In addition, if the amount of the isocyanate compound is greater than 15 parts by weight, the film becomes too hard and thus is disadvantageous in that the film suffers from cracks upon injection molding or can generate an excess of foreign substance powder upon slitting.

The photoinitiator may be any photoinitiator known in the art without limitation. Examples of the photoinitiator include Irgacure 250 (Bayer Co., Ltd.), Uvacure 1590 (SK Cytec Co., Ltd.), and the like. Examples of the radical photoinitiator include Irgacure 184, Irgacure 819, Irgacure 907, Irgacure 127, Vicure 30 (BASF Co., Ltd.), and the like.

The photoinitiator may be present in an amount of 1 part by weight to 15 parts by weight, particularly 5 parts by weight to 13 parts by weight based on 100 parts by weight of the acryloyl functional group-containing UV curable resin. If the amount of the photoinitiator is less than 1 part by weight, the coating film exhibits deteriorated hardness after injection molding. In addition, if the amount of the photoinitiator is greater than 15 parts by weight, there is a problem in that residual ingredients of the photoinitiator after curing cause an odor or toxic ingredients thereof remain on the surface of the coating film.

In addition, the antioxidant may include phenol antioxidants, phosphorus antioxidants, chelate antioxidants, and the like. For example, the antioxidant may include Irganox 1010, 1035, 1076, 1222 (Ciba Specialty Chemicals Co., Ltd.), and the like. The antioxidant may be present in an amount of 0.1 parts by weight to 2 parts by weight, particularly 0.1 parts by weight to 1 part by weight based on 100 parts by weight of the acryloyl functional group-containing UV curable resin. If the amount of the antioxidant is less than 0.1 parts by weight, the coating composition is likely to suffer from yellowing. In addition, if the amount of the antioxidant is greater than 2 parts by weight, the coating composition can suffer from deterioration in other required properties, although the antioxidant can provide saturated antioxidant effects.

Further, the components included in the coating composition are added to the solvent, and an organic solvent exhibiting excellent compatibility with binder resins, potential curing agents and other additives is advantageous as the solvent. Examples of the solvent used for this purpose may include ethyl acetate, butyl acetate, methylmethoxy propionate, ethylethoxy propionate (EEP), ethyl lactate, propylene glycol methyl ether acetate (PGMEA), methyl cellosolve acetate, ethyl cellosolve acetate, acetone, methyl isobutyl ketone, cyclohexanone, dimethylformamide (DMF), N,N-dimethylacetamide (DMAc), N-methyl-2-pyrrolidone (NMP), γ-butyrolactone, diethyl ether, ethylene glycol dimethyl ether, diglyme, tetrahydrofuran (THF), toluene, xylene, hexane, heptane, and octane. These solvents may be used alone or in combination thereof.

The solvent may be present in an amount of 200 parts by weight to 700 parts by weight, particularly 300 parts by weight to 400 parts by weight based on 100 parts by weight of the acryloyl functional group-containing UV curable resin. If the amount of the solvent is less than 200 parts by weight, the coating composition exhibits poor workability due to high viscosity of the curing agent, and if the amount of the solvent is greater than 700 parts by weight, the coating composition is disadvantageous in adjustment of a coating film thickness due to a low solid content thereof.

According to the present invention, the coating composition may include a leveling agent, a defoaming agent, and the like, which are typically used for coating liquid compositions, in an appropriate amount, and may further include compatible additives, such as surfactants, preservation stabilizers, sensitizers, anti-striation agents, and the like, as needed. In addition, to maintain constant hardness of the coating composition, the coating composition may include a silica sol. The silica sol is a colloidal solution including $SiO_2$ as a fundamental component. In addition, the silica sol exhibits strong penetrability since colloidal particles are spherical and have a relatively small particle diameter from 6 nm to 50 nm; excellent adhesion; and transparency. Thus, the silica sol is suitable for formation of the coating composition.

The present invention provides a method for preparing a coating composition which includes: preparing an acryloyl functional group-containing UV curable resin; and mixing the UV curable resin with an isocyanate compound, a photoinitiator, an antioxidant and a solvent.

The acryloyl functional group-containing UV curable resin may be prepared by copolymerization of an epoxy functional group-containing monomer and a silicone macromonomer, followed by addition reaction of an acrylic acid monomer. Here, copolymerization of the epoxy functional group-containing monomer and the silicone macromonomer may be performed using various methods, such as solution polymerization, photopolymerization, bulk polymerization, and the like. Here, additives, such as UV initiators, thermal curing agents and the like, may be further included, and a solvent such as methyl isobutyl ketone (MIBK) may be added to adjust viscosity or improve dispersibility.

In the method for preparing a coating composition, details not described relating to the UV curable resin are as described above.

FIG. 1 schematically shows a transfer sheet according to one embodiment of the present invention.

Referring to FIG. 1, the illustrated transfer sheet is a film capable of forming a molding decorative coating exhibiting excellent tactility, and includes a base film 110 and a coating layer 120.

The base film 110 may be formed of various materials, such as polypropylene, polyethylene, polyamide, polyester, polyacrylic, polyvinyl chloride, acrylic, polycarbonate, vinyl chloride, and urethane resins, without being limited thereto.

The base film 110 has a thickness from 0.02 mm to 0.1 mm, preferably from 0.03 mm to 0.08 mm. If the thickness of the base film is less than 0.02 mm, the film can be easily ruptured upon molding, and if the thickness of the base film is greater than 0.1 mm, the film can suffer from deterioration in handling and processability or exhibit deteriorated properties such as adhesion and the like, and also has a drawback in terms of economic cost.

The coating layer 120 includes the UV curable resin of the coating composition according to the present invention. The coating layer may be formed by treatment of the coating composition including the UV curable resin at a temperature from about 50° C. to about 170° C. for about 30 seconds to about 2 minutes. The coating composition of the coating layer 120 formed on one surface of the base film 110 allows easy formation of a print layer, a deposition layer and the like on the transfer sheet by suppressing adhesion thereof and improves handling properties of the sheet.

In addition, the coating composition according to the present invention can maintain soft tactility by adding a silicone macromonomer to the UV curable resin, thereby realizing the coating layer exhibiting excellent tactility.

The coating layer 120 may have a thickness from about 3 μm to about 10 μm. If the thickness of the coating layer is less than 3 μm, there is a concern that the coating layer cannot obtain appropriate hardness, and if the thickness of the coating layer is greater than 10 μm, there is a concern that the coating layer can also exhibit deteriorated hardness since it is difficult for UV to penetrate a lower end of the coating layer upon UV curing.

Figure 2:
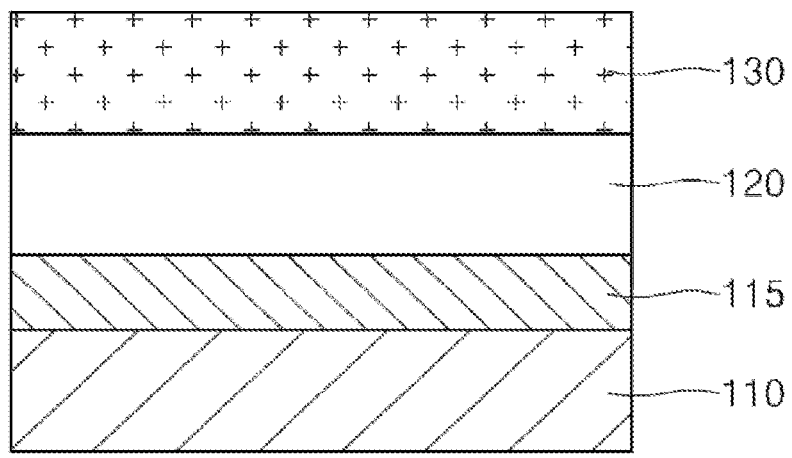
FIG. 2 schematically shows a transfer sheet according to another embodiment of the present invention, which is a release type transfer sheet.

FIG. 2 schematically shows a transfer sheet according to another embodiment of the present invention, which is a release type transfer sheet. Referring to FIG. 2, the illustrated transfer film includes a base film 110, a coating layer 120, a release layer 115, and an adhesive layer 130.

The coating layer 120 is formed on one surface of the base film 110, and includes the UV curable resin of the coating composition according to the present invention. The release layer 115 is formed between the base film 110 and the coating layer 120 in order to release the base film 110 after the transfer sheet is attached to a molded article.

The release layer 115 may be formed of a release agent, such as epoxy, epoxy-melamine, aminoalkyd, acrylic, melamine, silicone, fluorine, cellulose, urea resin, polyolefin, paraffin release agents, and the like, without being limited thereto. According to the present invention, the release layer 115 may have any thickness without limitation, and the thickness thereof may be appropriately adjusted in consideration of purposes of the present invention.

The adhesive layer 130 is formed on the coating layer 120 to attach the transfer sheet to the molded article. The adhesive layer 130 may be formed of polyacrylic, polystyrene, polyamide, chlorinated polyolefin, chlorinated ethylene-vinyl acetate copolymer, rubber resins, and the like. To protect the adhesive layer 130, a transfer sheet (not shown) may be attached to the adhesive layer 130.

When the transfer sheet having the structure as shown in FIG. 2 is attached to the molded article and then subjected to energy curing, a coating layer on the molded article basically provides scratch resistance, chemical resistance, abrasion resistance, high surface hardness and the like due to curing of the (meth)acryloyloxy functional group-containing UV curable resin included in the coating composition according to the present invention.

In addition, the transfer sheet according to the present invention may further include at least one layer of a print layer and a deposition layer, which are formed between the coating layer 120 and the adhesive layer 130, although the print layer and the deposition layer are not shown.

The print layer (not shown) may be formed by gravure coating. The print layer may have the same or different patterns and freely realize portraits, various colors, various patterns, and the like in a desired form.

When the print layer (not shown) is formed on an upper side of the coating layer 120, since the transfer sheet does not suffer from the blocking phenomenon or solvent erosion upon use thereof due to the coating layer which contains the coating composition including the UV curable resin, the print layer can provide aesthetics and vivid three-dimensional patterns.

Further, the transfer sheet according to the present invention may further include the deposition layer (not shown) formed between the print layer (not shown) and the adhesive layer 130. The deposition layer may be formed by vacuum deposition, and a material for the deposition layer may include aluminum (Al), copper (Cu), silver (Ag), platinum (Pt), tin (Sn), chromium (Cr), nickel (Ni) and the like.

The deposition layer (not shown) may have a thickness from 10 nm to 100 nm. If the thickness of the deposition layer is less than 10 nm, the deposition layer can provide insufficient gloss effects due to surface reflection. Conversely, if the thickness of the deposition layer is greater than 100 nm, there is a problem in that the deposition layer can suffer from cracks and deterioration in adhesion.

1. Manufacture of Transfer Sheet

Example

Methyl methacrylate (MMA), glycidyl methacrylate (GMA) and a silicone macromonomer having a molecular weight of 10,000 were copolymerized to a solid content of 40% using a propylene glycol monomethyl ether acetate (PG-MEA) solvent, thereby obtaining an acryl-silicone macromonomer copolymer having a weight average molecular weight of 30,000. Here, the silicone macromonomer was represented by General Formula 1, where n is from 130 to 140.

[Chemical Formula 1]

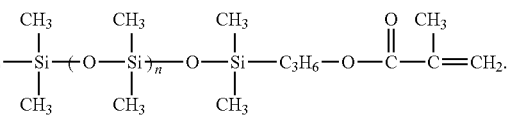

The silicone macromonomer was present in an amount of 5 parts by weight based on 100 parts by weight of GMA. Next, 50 parts by weight of an acrylic acid monomer was added to the prepared acryl-silicone macromonomer copolymer based on 100 parts by weight of the epoxy functional group-containing acrylate, followed by reaction at a temperature of 120° C. for 10 hours, thereby preparing an acryloyl functional group-containing UV curable resin having a molecular weight of 50,000.

10 parts by weight of a photocuring agent (Irgacure 184), 8 parts by weight of a hexamethylene diisocyanate trimer as a thermal curing agent, 100 parts by weight of a silica sol (particle diameter of 12 nm), 1 part by weight of an antioxidant (Irganox 1010) and 600 parts by weight of a solvent (MEK) were mixed based on 100 parts by weight of the prepared UV curable resin, thereby preparing a coating composition.

Next, a melamine release agent was coated to a thickness of about 1 μm onto a surface of a 50 μm thick PET base film using micro gravure coating, followed by heating at 150° C. for 30 seconds, thereby forming a release layer. Next, the prepared coating composition was coated to a thickness of about 6 μm onto the release layer using micro coating. Next, the coated coating liquid was heated at 150° C. for 30 seconds to form a coating layer containing the coating composition, thereby manufacturing a transfer sheet. Next, a 3 μm print layer was formed on the transfer sheet using gravure coating, followed by forming a 1.5 μm thick adhesive layer, thereby manufacturing a transfer sheet.

Comparative Example 1000 g of propylene glycol monomethyl ether acetate was introduced into a reactor, and 400 g of methyl methacrylate, 400 g of glycidyl methacrylate, 500 g of propylene glycol monomethyl ether acetate, 12 g of AIBN as an initiator and 1 g of dodecyl mercaptan as a chain transfer agent were added thereto, followed by polymerization at a temperature of 65° C. for 10 hours. Next, 0.5 g of hydroquinone was added to the reactor to stop reaction, thereby preparing an epoxy functional group-containing acrylate copolymer. The prepared acrylate copolymer had a weight average molecular weight of 28,000, and a molecular weight distribution of 2.5.

300 g of acrylic acid and 3 g of triethylamine were added to the prepared epoxy functional group-containing acrylic copolymer, followed by reaction at a temperature of 120° C., thereby preparing a UV curable resin.

50 g of the prepared UV curable resin, 85 g of pentaerythritol tetraacrylate, and 3 g of Irgacure 184 and 3 g of Irgacure 250 as UV initiators were mixed, thereby preparing a coating composition.

A transfer sheet was manufactured in the same manner as in Example 1 except that the transfer sheet included a coating layer containing the above coating composition.

2. Evaluation of Properties (1) Anti-Blocking Properties

The prepared transfer sheet having a length of 3000 m was wound and left alone for 3 days. Next, the transfer sheet was subjected to rewinding and observed as to blocking, and anti-blocking properties thereof were rated as high, medium, or low in accordance with ASTM-1893. Here, blocking refers to a phenomenon that the transfer sheets are bonded to each other.

(2) Hardness

The prepared transfer sheet was injection molded using a PC/ABS resin, followed by UV curing of the injection-molded article, thereby preparing a final injection-molded specimen for evaluation of abrasion resistance. Hardness of the specimen was evaluated under a load of 1 kg using a pencil hardness tester.

(3) Abrasion Resistance

The prepared transfer sheet was injection molded using a PC/ABS resin, followed by UV curing of the injection-molded article, thereby preparing a final injection-molded specimen for evaluation of abrasion resistance. For the specimen, the minimum number of repetitions causing scratches was evaluated under a load of 1 kg using an RCA tester.

(4) Sensory Evaluation of Tactility

Sensory evaluation of tactility was performed on an adherend, to which each of the transfer sheets of Example and Comparative Example was applied, by a total 60 persons including 30 men and 30 women. The evaluators rated tactility of the transfer sheet as "O: Excellent", "Δ: Normal", or "X: Poor". An average value of experimental results for each transfer sheet is shown in Table 1.

TABLE 1

|  | Anti-blocking properties | Hardness | Abrasion resistance | Tactility |
| --- | --- | --- | --- | --- |
| Example | O | 2H | 200 times or more | O |
| Comparative Example | Δ | H | 100 times | X |

Referring to Table 1, it was confirmed that the transfer sheet of Example exhibited excellent properties in terms of winding and storage based on excellent anti-blocking properties thereof. In addition, the transfer sheet of Example could secure better hardness than that of Comparative Example and could also secure abrasion resistance due to the coating layer according to the present invention even after a release paper was peeled off. Finally, as for sensory evaluation of tactility, the evaluators evaluated the transfer sheet exhibiting outstanding softness as excellent, and it could be seen that since the silicone macromonomer was introduced into the coating composition, the coating layer of the transfer sheet of Example exhibited surface smoothness.

On the other hand, the transfer sheet of Comparative Example exhibited inferior anti-blocking properties, hardness and abrasion resistance to Example. In addition, since the transfer sheet of Comparative Example used the UV curable resin which did not include the silicone macromonomer, the coating layer of the transfer sheet of Comparative Example did not maintain surface smoothness. Thus, the transfer sheet of Comparative Example was not evaluated as exhibiting good tactility.

Although the present invention has been described with reference to some embodiments, it should be understood that various modifications, changes, alterations, and equivalent embodiments can be made by those skilled in the art without departing from the spirit and scope of the invention. Therefore, the scope of the invention should be limited only by the accompanying claims and equivalents thereof.

The invention claimed is:

1. A coating composition comprising:
an acryloyl functional group-containing UV curable resin, an isocyanate compound, a photoinitiator, an antioxidant, and a solvent,
wherein the acryloyl functional group-containing UV curable resin is prepared by copolymerization of an epoxy functional group-containing acrylate monomer and a silicone macromonomer, followed by addition reaction of an acrylic acid monomer.

2. The coating composition according to claim 1, wherein the epoxy functional group-containing acrylate monomer is any one selected from the group consisting of glycidyl acrylate, glycidyl methacrylate, glycidyl-α-ethyl acrylate, glycidyl-α-n-propyl acrylate, glycidyl-α-butyl acrylate, 3,4-epoxybutyl methacrylate, 3,4-epoxybutyl acrylate, 6,7-epoxyheptyl methacrylate, 6,7-epoxyheptyl acrylate, and 6,7-epoxyheptyl-α-ethyl acrylate.

3. The coating composition according to claim 1, wherein the silicone macromonomer is represented by Formula 1:

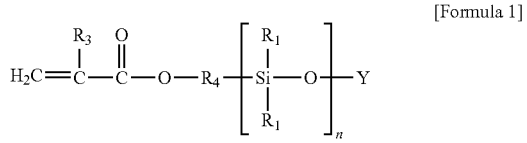

[Formula 1]

wherein $R_1$ and $R_2$ are each independently a $C_1$ to $C_{12}$ alkyl group; $R_3$ and $R_4$ are each independently hydrogen or a $C_1$ to $C_{12}$ alkyl group; Y is hydrogen or a $C_1$ to $C_{12}$ alkyl group; and n is an integer from 60 to 300.

4. The coating composition according to claim 1, wherein the silicone macromonomer has a weight average molecular weight from 500 to 22,000.

5. The coating composition according to claim 1, wherein the silicone macromonomer is present in an amount of 0.1 parts by weight to 5 parts by weight based on 100 parts by weight of the epoxy functional group-containing acrylate monomer.

6. The coating composition according to claim 1, comprising:
   1 part by weight to 15 parts by weight of an isocyanate compound;
   1 part by weight to 15 parts by weight of a photoinitiator;
   0.1 parts by weight to 2 parts by weight of an antioxidant; and
   200 parts by weight to 700 parts by weight of a solvent, based on 100 parts by weight of the acryloyl functional group-containing UV curable resin.

7. A method for preparing a coating composition, comprising:
   preparing an acryloyl functional group-containing UV curable resin; and
   mixing the UV curable resin with an isocyanate compound, a photoinitiator, an antioxidant, and a solvent,
   wherein the acryloyl functional group-containing UV curable resin is prepared by copolymerization of an epoxy functional group-containing acrylate monomer and a silicone macromonomer, followed by addition reaction of an acrylic acid monomer.

8. A transfer sheet comprising:
   a base film; and
   a coating layer formed on one surface of the base film and containing the coating composition according to any one of claim 1.

9. The transfer sheet according to claim 8, further comprising:
   a release layer formed between the coating layer and the base film; and
   an adhesive layer formed on the coating layer.

10. The transfer sheet according to claim 9, further comprising:
    at least one layer of a print layer and a deposition layer between the coating layer and the adhesive layer.

* * * * *